Feb. 27, 1962  D. G. LYON  3,022,905
UNLOADER APPARATUS FOR STACKED ARTICLES OR THE LIKE
Filed July 25, 1958  4 Sheets-Sheet 1
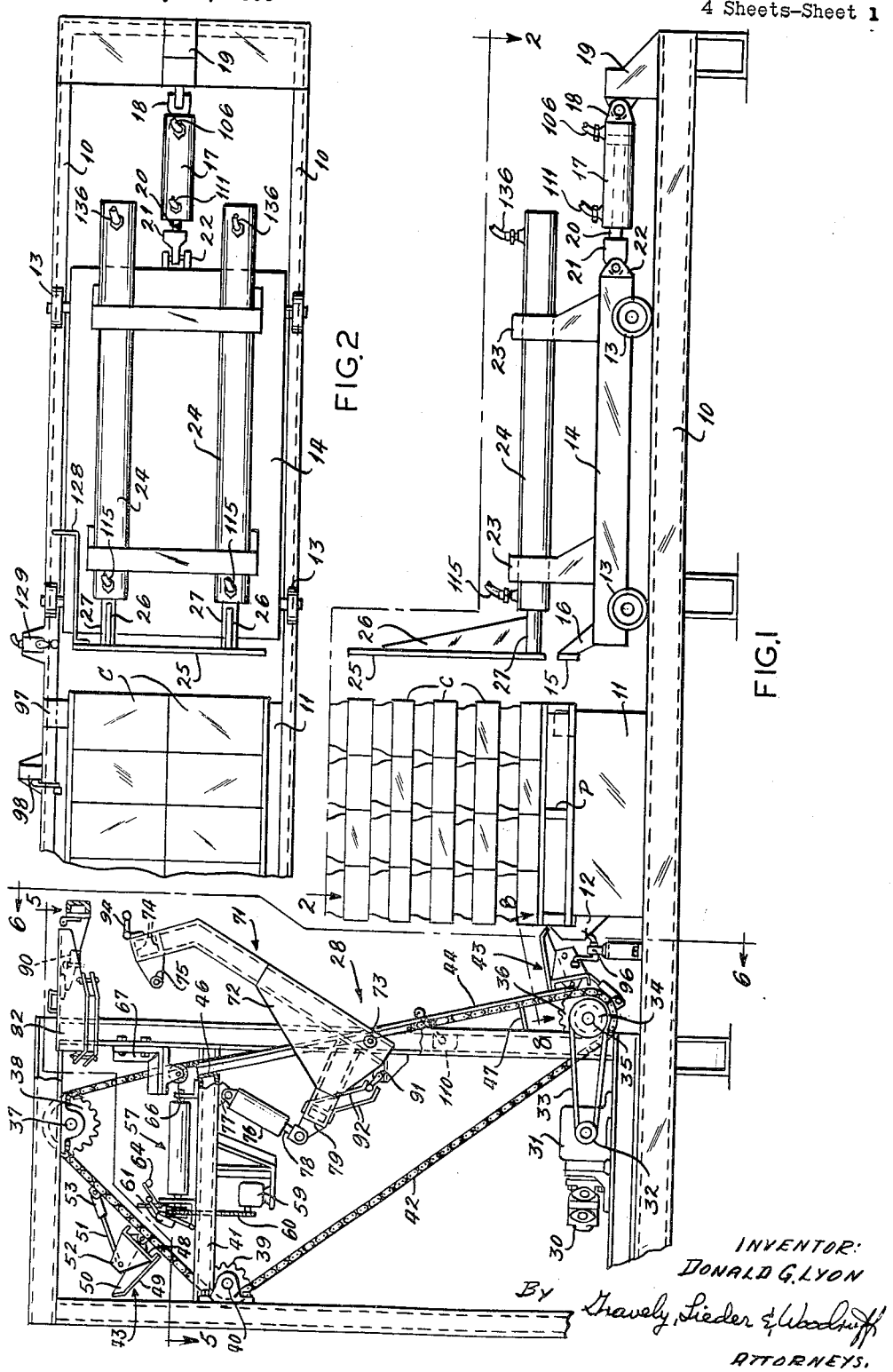
INVENTOR:
DONALD G. LYON
By Gravely, Lieder & Woodruff
ATTORNEYS.

Feb. 27, 1962 D. G. LYON 3,022,905
UNLOADER APPARATUS FOR STACKED ARTICLES OR THE LIKE
Filed July 25, 1958 4 Sheets-Sheet 2

INVENTOR:
DONALD G. LYON
By Gravely, Lieder & Woodruff
ATTORNEYS

Feb. 27, 1962  D. G. LYON  3,022,905
UNLOADER APPARATUS FOR STACKED ARTICLES OR THE LIKE
Filed July 25, 1958  4 Sheets-Sheet 3

INVENTOR:
DONALD G. LYON
BY Gravely, Lieder & Woodruff
ATTORNEYS.

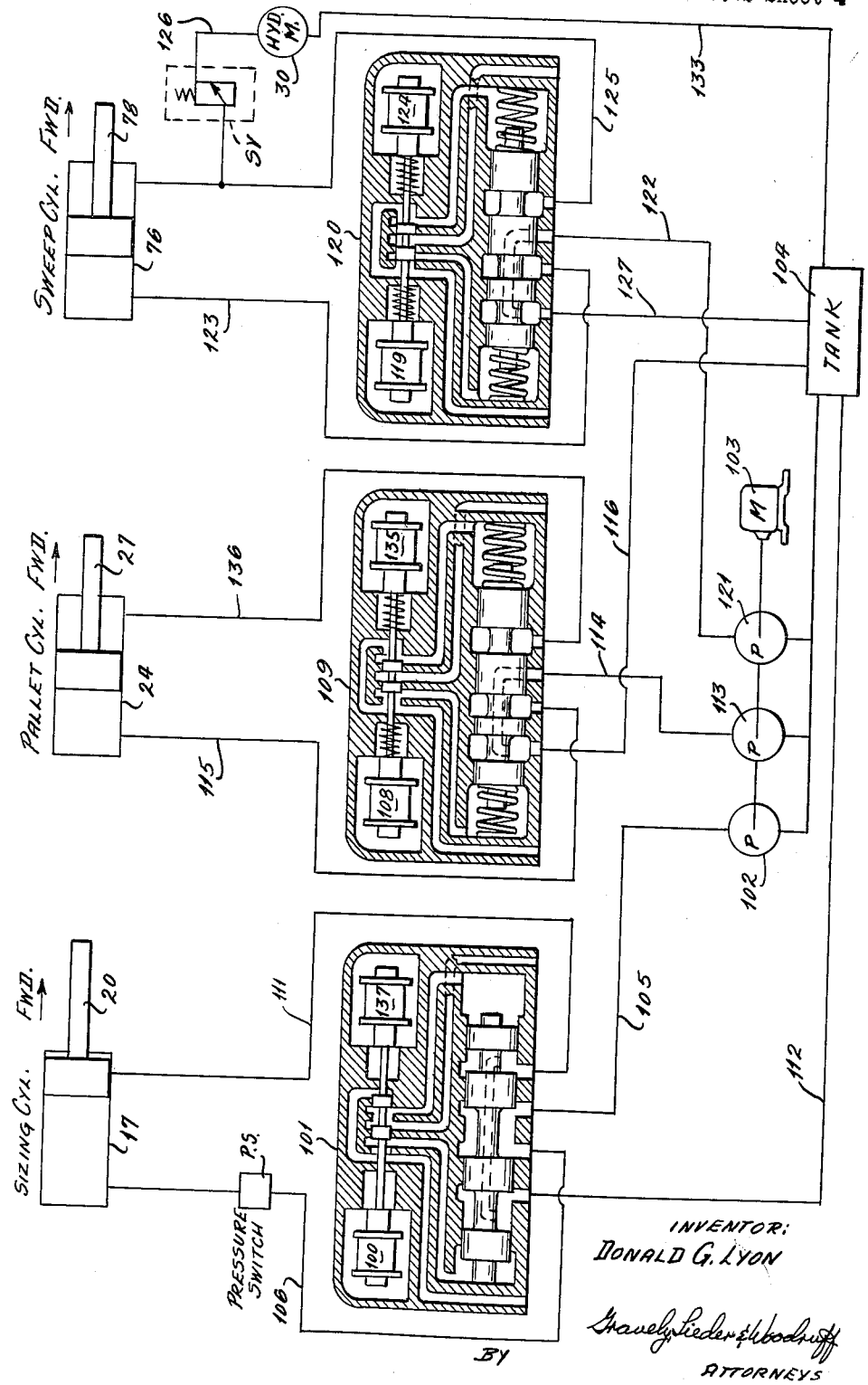

United States Patent Office 3,022,905
Patented Feb. 27, 1962

3,022,905
UNLOADER APPARATUS FOR STACKED
ARTICLES OR THE LIKE
Donald G. Lyon, Monticello, Iowa, assignor to Barry-Wehmiller Machinery Company, St. Louis, Mo., a corporation of Missouri
Filed July 25, 1958, Ser. No. 750,907
2 Claims. (Cl. 214—8.5)

This invention relates in general to new and useful improvements in material handling apparatus, and especially to an improved automatic unloader for palletized case goods and the like, although the apparatus is not to be limited merely to case goods.

A representative example of the usefulness of the apparatus may be found in the bottling industry. In recent years it has become a customary procedure to return the empty containers in palletized condition to the bottling plant and to manually unstack the pallet load onto one end of a conveyor system adapted to carry the cases to a case unloader so that the individual containers, bottles or the like, may be passed to a washer and sterilizer before being filled, capped and returned to suitable cases for delivery either to a storage area or a distribution loading area. The manual procedure of unstacking the pallets of stacked cases is very slow and the rough handling usually encountered causes much breakage so that the expensive and high capacity washing machines are not efficiently operated at all times.

The filled containers are then returned to the cases and are stacked and again loaded onto pallets for storage or distribution. Novel apparatus for automatically loading and unloading a pallet simultaneously has been disclosed and claimed by me in a prior application for patent Serial Number 475,968, filed December 17, 1954, and entitled Automatic Pallet Loader, now No. 2,885,097, granted May 5, 1959.

The handling of stacked cases in some instances may be carried out without the use of pallets. An example of this is found in the plants where the delivery truck equipment has not been altered to receive pallets, and there are still many instances where the expense of altering the trucks does not justify the changes. Therefore, the loading and unloading operation is usually now carried out by manual methods and the cases are generally placed in stacked condition on a loading platform. However, the case stacks may be handled by side grab lift trucks and deposited in the unstacker apparatus of this invention for unstacking, and the apparatus shown herein will operate without the interposition of pallets so that the utility of the apparatus may be extended to plants where a pallet system has not yet been adopted, or where the plant is not suitably designed to use pallets, but in which the unstacking operation may be more efficiently and speedily performed with the apparatus hereof.

Accordingly, an object of this invention is to provide apparatus for handling stacks of cases to be unstacked row by row without the assistance of a pallet, whereby the utility and flexibility of the apparatus may be broadened to take in all types of plant layouts in which stacked case handling is a necessary operation.

It is an object of this invention to provide an automatic scrambler or unstacker for stacked cases of bottles and the like.

Another object of this invention is to provide an automatic scrambler or unstacker for palletized cases of bottles, the apparatus for which is of such a nature that it receives stacks of cases from a pallet and individually places the cases of empty bottles on a conveyor for movement toward a bottle washing machine.

Still another object of this invention is to provide an automatic case unstacker apparatus which may be used in conjunction with a case stacker and pallet loader, or may be used separately for unstacking a pallet.

Yet another object of this invention is to provide an automatic unloader apparatus which may be adapted not only to handle stacks of articles of varying heights, but also to handle articles in box-like cases which are normally heavy and difficult to handle.

These objects, together with advantages which will become more apparent hereinafter, reside in the details of construction and operation of a preferred form of apparatus more fully described and claimed herein, reference being had to the accompanying drawings forming a part hereof, wherein like numerals refer to like parts, and in which:

FIG. 1 is a longitudinal elevational view of apparatus for unstacking pallets loaded with vertically stacked articles, and shows the details and arrangement of parts and components thereof in relation to a pallet loaded with stacks of articles to be unstacked;

FIG. 2 is a fragmentary horizontal view of the apparatus taken at line 2—2 of FIG. 1;

FIG. 9 is a schematic diagram of the hydraulic system embodied in the apparatus hereof.

Figure 3:
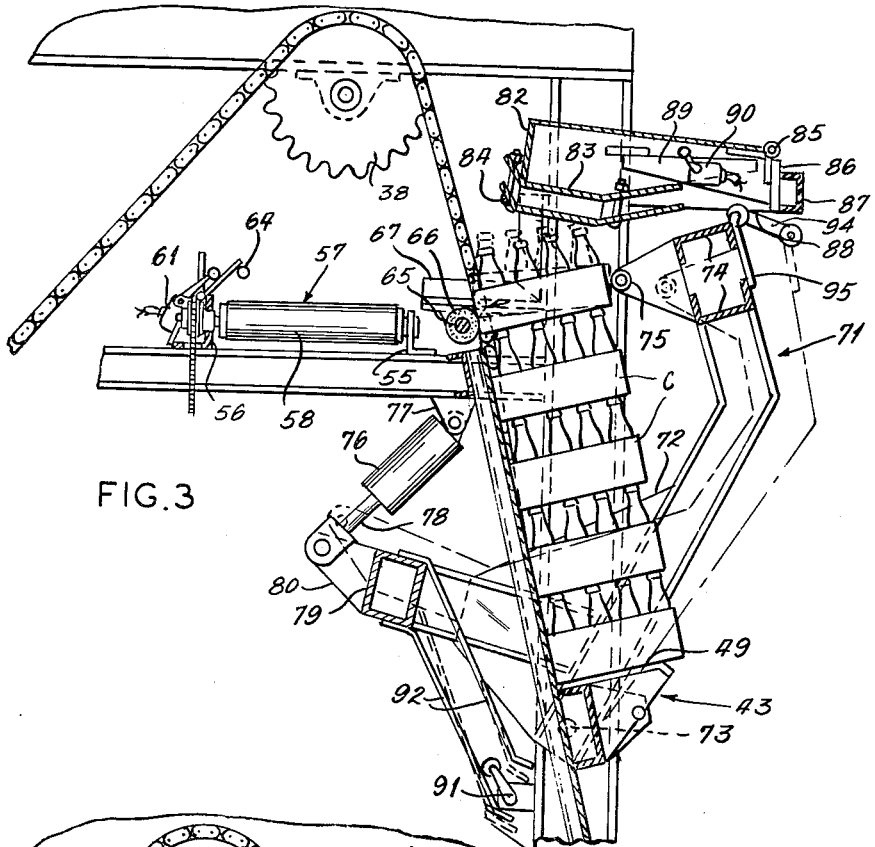
FIG. 3 is another fragmentary sectional elevational view of the upper portion of the apparatus of FIG. 1 showing a first stage of the operation thereof.

The apparatus shown in FIGS. 1 and 2 comprises a longitudinal frame assembly of any suitable construction in which side rails 10 support a simple platform structure 11 therebetween and intermediate the length thereof. The platform 11 is arranged to support a pallet P loaded with vertical stacks of articles C, such as cases of empty containers, bottles, or the like, in which upper articles rest upon lower articles. As previously pointed out the platform 11 may be loaded with a similar arrangement of stacked articles C in which the pallet P is not used. However, the following description will, for convenience, make reference to a pallet and no limitation is to be implied therefrom.

A pallet stop 12 is located at the left margin of the platform 11 for purposes of properly locating the pallet. The rails 10 at the right side of platform 11 support the rollers 13 of a carriage frame 14 so that the face plate 15 attached thereto by brackets 16 may engage the pallet P and shift the same against the stop 12 during unstacking operation. The carriage frame 14 is moved in reverse directions by a fluid pressure motor device 17 having its base end 18 suitably connected to a fixed bracket 19 on the frame. The rod 20 of motor device 17 is connected by its head 21 to the carriage bracket 22. Spaced frame-like standards 23 on the carriage frame 14 carry a pair of fluid pressure motor devices 24 which are connected to operate together by a pusher frame 25 braced by brackets 26 on the respective operating rods 27. The pusher 25 is vertically erect to engage the columns of stacked articles C and shift the same to the left toward an unstacker device 28 row by row and in proper automatically controlled sequence, as will presently appear, so that successive rows of articles may be displaced from the platform 11.

The apparatus, thus far described, includes the load supporting and receiving platform 11, the fluid pressure operated load discharging means represented for convenience by the carriage 14, and the article receiving and unstacking device 28. It should be understood and appreciated that the load discharging means 14 may be dispensed with and the article stacking device disclosed and described in my prior application Serial Number 475,968 substituted therefor should it be desired to simultaneously load the pallet P with filled articles while unloading the empty articles, or where first articles can be unloaded by the action of loading second articles.

The unstacker 28 (FIGS. 1, 3 and 4) includes a frame of vertical and horizontal members carried by the rails 10. For example, the lower horizontal member carries a hydraulic motor 30 connected to a gear unit 31 having the take-off pulley 32 connected by belt 33 to a driven pulley 34 on a shaft 35 supported by the adjacent vertical frame members. Shaft 35 extends transversely of the frame and drives a pair of sprockets 36 (one being shown). The uppermost horizontal frame member carries a transverse shaft 37 on which idler sprockets 38 are affixed in alignment with sprockets 36. A second set of idler sprockets 39 are rotatably supported on a shaft 40 carried transversely in the frame adjacent an intermediate horizontal frame member 41. Suitable chains 42 are trained over the aligned sprockets 36, 38 and 39, and case elevating flights 43 are connected to these chains to move to and through a position adjacent the stop 12 on the pallet support 11. The row of stacked articles pushed off the pallet P move onto the flight 43 and the slight inclined attitude of the flight at this position causes the row of stacks to tilt and cleanly separate from the rest of the case stacks on the pallet. The tilted stack of cases is re-received on a guide frame 44 and the flight 43 passes upwardly along the guide (FIGS. 3 and 4).

Figure 8:
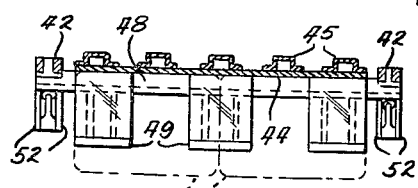
FIG. 8 is an another fragmentary plan view at line 8—8 in FIG. 1.

The guide 44 comprises a flat sheet member suitably stiffened at the rear surface by a plurality of longitudinal rib elements 45 which are supported at the upper ends on a transverse (width-wise) support 46. The lower portion of the guide 44 is held outwardly by suitable brackets 47 so that the guide 44 is retained at the desired inclined attitude parallel with the vertical span of the flight elevating chains 42. Each article elevating flight 43 (FIGS. 1 and 8) comprises a transverse channel member 48 having an attachment to certain links of the chain 42, and the member 48 supports a plurality of laterally spaced article lifting plates 49 braced by suitable webs 50. The members 48 are in each instance maintained in fixed position relative to the chain 42 by adjustable brace rods 51 connected between the chain links and a bracket 52 on the member 48 at each end, as is common in assemblies of this character. Thus, the several plates 49 may be held substantially perpendicular to the chains 42 by adjusting the rods 51 in the threaded end fittings 53. A turnbuckle device may also be employed in place of fittings 53, if desired.

The guide assembly 44 is located between spaced vertical frame members nearest thereto, and the pair of chains 42 move at each side so that the flight carrying channel members 48 slide over the face of the sheet member. The lift plates 49 are laterally spaced so that a center one supports the ends of two adjacent articles C where the articles are two in a row (see FIG. 8), and the outside plates 49 support the remote ends of the articles.

Figure 4:
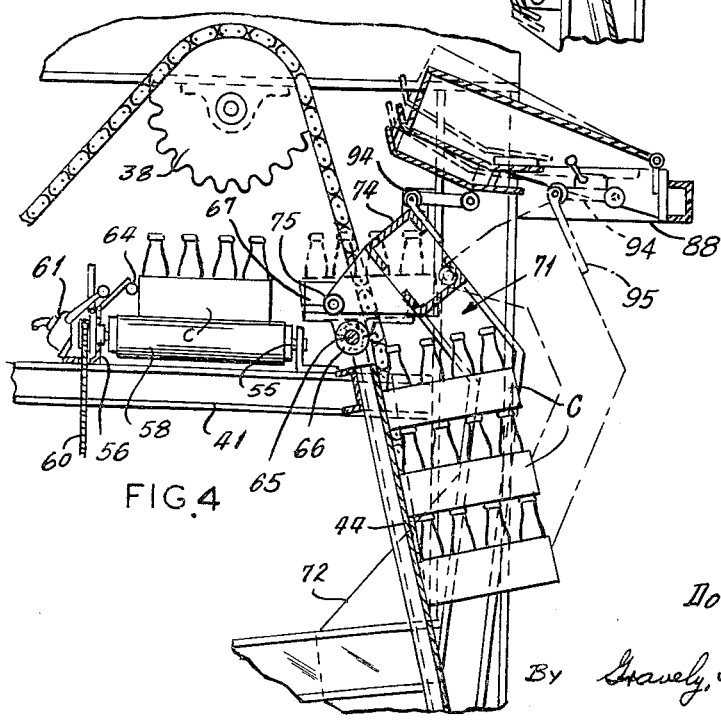
FIG. 4 is a view similar to that of FIG. 3 wherein the apparatus is shown in a further stage of operation more advanced than that in FIG. 3.
Figure 5:
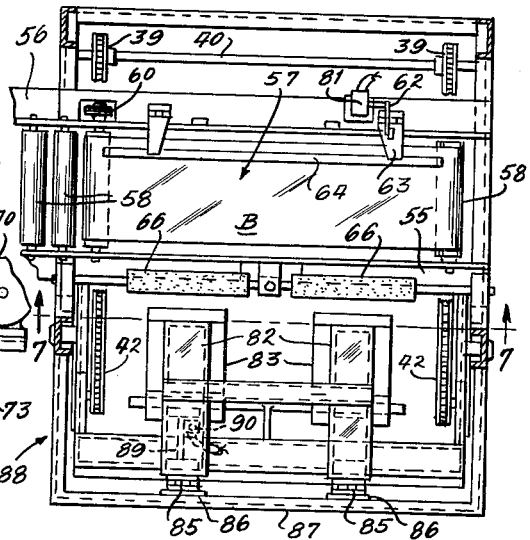
FIG. 5 is a fragmentary plan view of a portion of the apparatus seen at line 5—5 of FIG. 1.

As shown in FIGS. 1, 3 and 4, the intermediate horizontal frame member 41 supports transverse side members 55 and 56 of an article discharge roller conveyor assembly 57 in which a series of rollers 58 (the nearest one being shown) are arranged in the usual manner. The series of rollers 58 is power driven from motor 59 through a suitable sprocket chain drive 60 to a driven sprocket on the projecting end of the shaft for the nearest roller 58 and such driven roller is connected to other roller by an endless belt B (FIG. 5). The conveyor assembly 57 is positioned (FIG. 3) near the upper end of the guide 44. The side member 56 of the conveyor 57 carries a safety switch 61 in which the actuating arm 62 is adapted to be operated by arm means 63 carrying an elongated bumper bar 64 extending parallel with the conveyor and at one side so as to be hit by the articles C in the event the conveyor should become loaded to the point where the articles cannot be discharged. In such event, other articles being discharged onto the conveyor 57 (as in FIG. 4) will bump into the row of articles previously discharged and cause them to shift against the bumper bar 64, thus actuating switch 61 to stop the apparatus. The discharge conveyor 57 must then be cleared of articles before operation may be resumed. This feature of the control will be described in connection with the circuit diagram of FIG. 10.

Figure 6:
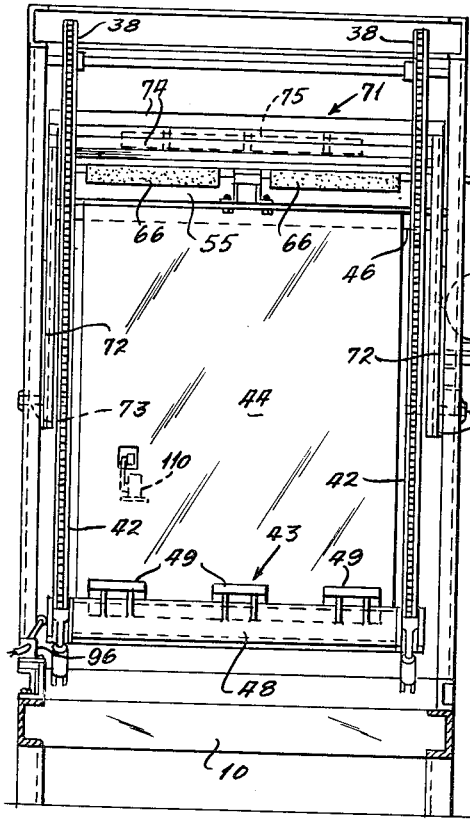
FIG. 6 is a transverse sectional elevation at line 6—6 in FIG. 1.
Figure 7:
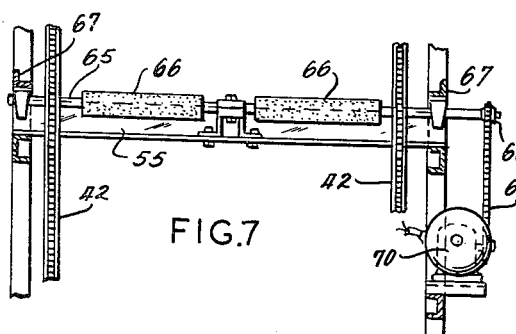
FIG. 7 is a fragmentary sectional elevation at line 7—7 in FIG. 5.

Between the upper end of guide 44 and the conveyor 57 (FIGS. 1, 6 and 7) there is positioned an article lifting device in the form of a roller having a transverse shaft 65 carrying friction sleeves 66 for each row of stacks. The shaft 65 is carried in bearings supported from brackets 67 attached to the adjacent vertical frame members. One end of shaft 65 has a sprocket 68 fixed thereto for driven connection through a chain 69 to a drive motor 70. The shaft 65 is continuously driven and is contacted at the sleeves 66 by successive articles so that such articles are rapidly aligned just prior to being elevated (see the dotted outline in FIG. 3) above the next adjacent articles for passage over the sleeves 66 as in the dotted outline position of FIG. 4.

The means for successively displacing the uppermost articles of the stacks thereof rising along the guide 44 is shown in FIGS. 1, 3 and 4. Such means comprises an oscillating sweep 71 formed with spaced side frames 72 pivoted on pin and bearing means 73 at each vertical frame member. The article sweep frames 72 are interconnected by cross members 74 at one end which is provided with an article pusher bar 75 extending parallel to the roll shaft 65 and movable toward and away from the latter. The sweep is caused to move by a pressure fluid motor 76 carried by a hanger bracket 77 on the frame member 41 and having its rod 78 pin connected to another end of the frame 72 at a cross brace member 79 carrying a bracket 80 intermediate its length. The pusher bar 75 functions to engage each pair of articles as the articles are moving upwardly at the roll sleeves 66 and to straighten them out if angularly cocked. The bar 75 also pushes on the articles so that the friction engagement at these sleeves will increase to cause the articles to move up faster than the remaining stack to assume the position in dotted outline in FIG. 3. The slight upward movement of bar 75 before it reaches top dead center also lifts the articles at the rear sides. Once the articles are over the sleeve centers the bar 75 will push them leftwardly through the dotted position in FIG. 4 and onto conveyor 57, but not enough to carry them into the bumper bar 64 to stop the apparatus.

The unstacker device 28 is provided with a means to measure the height of the articles lifted by the flights 43 so that each uppermost article may be brought to the correct elevation with respect to the lifting device 66 before the sweep 71 operates. This is an important operation as it will take care of dimension variations at the uppermost articles and, therefore, not require measuring the heighth of the stack where the dimension variations between articles will accumulate. The pusher bar 75 cannot subject the articles to crushing loads or stall the motor 30 with consequent damage to the moving parts. The article measuring device comprises a frame 82 over each vertical column of articles, each frame 82 having a face plate 83 for a tall article, such cases of large bottles and a removable face plate 84 therebelow for standard height articles. Each frame 82 has a hinge bracket 85 connected to an adjustable block 86, in turn, carried on the crosswise arm 87 of a main frame outrigger structure 88. The block 86 supports a bracket 89 under each frame 82 to catch the frame in its downward movement. One such bracket 89 carries a limit switch 90 to be actuated by the frame 82, the limit switch being wired into the circuit containing a limit switch 91 (FIGS. 1, 3 and 10) whose arm is selectively operated in opposite directions by bending the adjustable fingers 92 on the member 79 which is part of the sweep 71.

Figure 10:
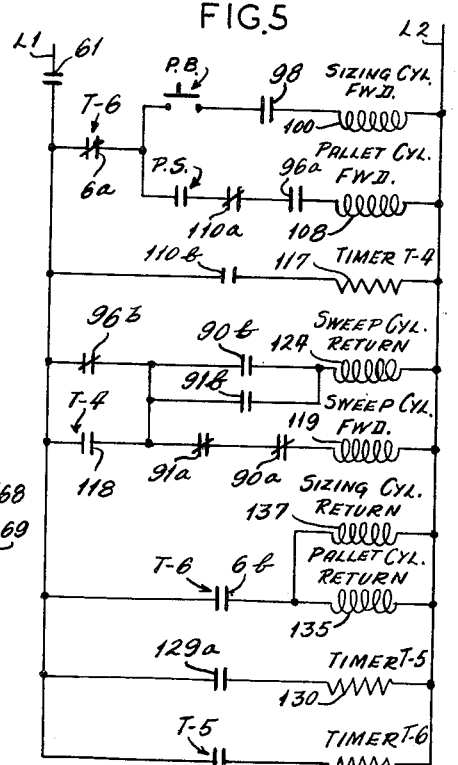
FIG. 10 is a schematic circuit diagram for the present apparatus.

At the proper time the uppermost articles C (FIGS. 3 and 4) lift the face plates 84 (or face plates 83 if it is for large sizes) to allow the contacts in switch 90 to return to the unoperated condition of FIG. 10 in which the contact 90a is closed and contact 90b is open. The above action stops the motion of the flight 43 by changing the setting at valve 120 (FIG. 9) so that the sequence valve closes due to loss of the pressure fluid to cause the motor 30 to stop. At the same time the sweep motor 76 is caused to extend its rod 78 and swing the frame 71 at pivots 73 in a counterclockwise direction. The sweep bar 75 contacts the rear edge of the articles or cases uppermost in the stacks, forcing them into the sleeves 66 where the action of the device increases the rate of lift and separates the upper articles from the next lower articles to pass over the device 66 and onto the discharge conveyor 57. The bar 75 also assists by lifting the rear side of the articles as noted above.

The sweep 71 reaches a forward position as in FIG. 4 and a finger 92 thereon operates the limit switch 91 to reverse the motor 76 by closing the reverse contacts 91b and opening forward contacts 91a. The sweep 71 reverses and releases the measuring frames 82 to again operate the limit switch 90, and it also operates the switch 91 to reverse the contacts for forward travel. The means to keep the sweep in operation after the articles have broken contact at face 84 (FIGS. 3 and 4) is an adjustable sweep finger 94 pivoted at bracket 95 and having an outer roller engageable with the face 84 as the bar 75 moves to displace the articles away from such face plate. After completing its forward movement, the sweep reverses as explained and when its motor 76 reaches a fully retracted position the pressure fluid (FIG. 9) in the retract side builds up pressure sufficiently to open a pressure responsive sequence valve SV which then directs the pressure fluid to the motor 30 which again drives the flight 43 to lift the stack until the switch 90 is actuated to its normal condition. It is understood that the sweep 71 and motor 30 will automatically operate in sequence to dispose of the articles stacked on flight 43. When all articles are disposed of, the motor 30 will continue to run until the next flight 43 has reached its load receiving position and has operated a limit switch 96 to open contacts 96b and stop motor 30.

Turning now to FIGS. 1, 2, 9 and 10, it is pointed out that the pallet P when placed upon the support 11 against the stop 97 actuates a limit switch 98, but nothing happens until the attendant hits a push botton PB placed conveniently for that purpose and closes contacts therein. The electrical current from supply lines L1 and L2 (FIG. 10) passes through the closed contacts 6a of an off-delay type timer T6, the contacts of switch PB and switch 98 to the solenoid coil 100 on the forward side of a closed center type four way valve 101 shown in FIG. 9. A supply pump 102 driven by motor 103 passes pressure fluid from supply tank 104 to conduit 105 and through the valve to conduit 106 and the motor means 17 to drive its rod 20 forward and advance the carriage 14 leftward (FIG. 1) to have the plate 15 properly size and position the pallet P against stop 12, the exhaust fluid returns to tank 104 via conduit 111, the valve 101 and conduit 112. When this operation is complete the pressure increases in conduit 106 to close the contacts in a pressure switch PS which, as will appear, automatically transfers pressure fluid to the motors 24 by the circuit from its contacts through the solenoid coil 108 on the forward side of the open center type four way valve 109 (FIG. 9). But first the circuit, including the closed contacts in the pressure switch PS, must be completed by the normally closed set of contacts 110a of the limit switch 110 located in the guide 44 (see FIG. 1) with its actuating arm located to be hit by the stack of articles displaced from the pallet, and through the closed contacts 96a of limit switch 96. The contacts 96a are closed at the start of each cycle by a flight 43 reaching the position adjacent stop 12 ready to receive the displaced stacks. The circuit to coil 108 is now complete and forward drive at motors 24 will move the pusher 25 leftwardly (FIG. 1) until the stacks fall into guide 44 and open the normally closed set of contacts 110a while closing the normally open set of contacts 110b (FIG. 10). This action of limit switch 110 stops the pusher 25 where it is since the open center valve 109 will allow the pressure fluid to flow from supply pump 113 and conduit 114 to conduit 115 during motor operation, but when coil 108 (FIG. 9) is de-energized the valve 109 goes to a center position to trap the motor piston and merely let pump 113 circulate the fluid back to the tank via conduit 116.

Closing of contacts 110b energizes coil 117 in an off-delay type timer T4 so that contacts 118 thereof close immediately and stay closed for a pre-set time. The timer T4 will not open as long as coil 117 is energized, therefore, the switch 110 must be located to be cleared by the stacks shortly after the flight 43 begins its function to allow contacts 110b to open. Such a timer, and the same is true of timer T6, may conveniently consist of a well known dash-pot device having a restricted orifice, and a solenoid coil to set it in operation to hold the contacts 118 closed long enough to complete a circuit to the normally closed contacts 91a and 90a (FIG. 10) and to supply current to coil 119 of the open center type four way valve 120 (FIG. 9). A pump 121 supplies fluid from reservoir 104 through conduit 122 and conduit 123 to the forward side of the sweep motor 76. The exhaust fluid returns to tank 104 via conduit 127 from valve 120 and conduit 125. The sweep 71 is, therefore, operated to unstack the uppermost articles and to operate the limit switch 91 so that contacts 91a open and contacts 91b close. The current passes through the contacts 96b, such contacts 96b closing after the flight 43 has left its starting position to actuate switch 96 to open contacts 96a. Timer T4 now times out, but contacts 96b are closed so that a circuit is completed through the closed contacts 91b which assures full retraction of the sweep 71 by energizing the reversing coil 124 in valve 120. Pressure fluid then passes from conduit 122 to conduit 125 and to motor 76. As soon as the sweep has fully reversed so as to clear the rising path of the conveyor and not to be hit by articles, the pressure builds up in conduit 125 to cause the pressure responsive sequence valve SV (FIG. 9) to open and supply conduit 126 leading to the hydraulic motor 30 for driving the elevator, the motor 30 having a conduit 133 connected back to tank 104. The stacks of articles thereby are again lifted until the measuring means 82 responds to operate switch 90 and the foregoing operations and sequences are repeated.

Once the flight 43 is emptied, the motor 30 will run until the next flight arrives at the limit switch 96 (FIG. 1) to open contacts 96b and stop the unstacker device, while closing contacts 96a in the circuit to the forward coil 108 (FIGS. 9 and 10) of the valve 109 connected to motor 24. The forward motion of this motor will deposit another row of stacks on the next flight 43 and limit switch 110 will respond by closing contacts 110b and opening contacts 110a to stop the motor means 24.

This sequence will continue until the motor means 24 reaches the outward limit of travel at which point a trailing arm 128 (FIG. 2) picks up a limit switch 129 and closes the normally open contacts 129a completing a circuit to a coil 130 which sets the associated on-delay type timer T5 in operation. A period is allowed for the pusher 25 to complete its last unloading stroke and to cause the last stack to fall into the guide 44 and actuate switch 110 to open contacts 110a. This stops the forward stroke as previously explained. At the time set T5 contacts 131 close and a circuit is made to coil 132 of the previously noted timer T6 having normally closed contacts 6a and normally open contacts 6b. The contacts 6b are closed at this time and contacts 6a are opened so that a circuit (FIGS. 9 and 10) is made to the solenoid coil 135 on the reversing side of valve 109 and pressure fluid from conduit 114 now passes through conduit 136 to motor 24 to reverse the same and retract the pusher 25. Simultaneously, a circuit is made to the solenoid coil 137 on the reversing side of valve 101 to supply pressure fluid to conduit 111 and motor 17 to fully retract the carriage 14, the exhaust fluid returning to tank 104 via conduit 112. The apparatus will return to a starting condition with contacts 98 and button PB contacts open, when timer T6 has run its time so that contacts 6a close for the next cycle. The time for T6 must be long enough to allow motors 24 and 17 to fully retract. Also, during reversal of motor 17 through valve 101, the conduit 106 is at zero pressure and the pressure switch PS has its contacts return to open position.

The foregoing description has been given by reference to FIGS. 9 and 10 so that the pressure fluid circuits and the electrical circuits might be more easily followed without the necessity for showing all of the well understood fluid conduit and electrical wiring connections. There is here presented a sequence or step by step résumé of the essential operations of the apparatus and functions of the electrical controls, such as the limit switches and timer devices.

(1) A load of articles is deposited on support 11 to close limit switch 98 which is otherwise normally open.

(2) The loader or operator depresses push button PB.

(3) Closing PB contacts energizes the forward solenoid coil 100 in valve 101 to supply pressure fluid to motor 17 to extend its rod 20. The rod 20 continues to extend until the load is firmly against stop 12.

(4) At stop 12, the pressure increases behind the rod 20 and closes the contacts in pressure switch PS.

(5) Closure of contacts in pressure switch PS energizes the forward coil 108 in valve 109 to supply motor 24 which extends the pusher 25 on rods 27 and causes the articles to slide to the left (FIG. 1) toward the unstacker 28.

(6) The first stack of articles shifts onto a flight 43 and tilts into the guide 44 to actuate limit switch 110 by closing contacts 110b and opening contacts 110a.

(7) Opening of limit switch contacts 110a de-energizes the forward coil 108 in valve 109 to stop motor 24.

(8) Closing of limit switch contacts 110b energizes the coil 117 of off-delay timer T4 to close its contacts 118, and the contacts open again shortly after the flight 43 begins to elevate the first stack of articles and has cleared limit switch 110 so that the latter may return to its starting position with contacts 110a closed and contacts 110b open to de-energize the coil 117 in timer T4.

(9) During closure of contacts 118 current is supplied to the return coil 124 of valve 120 through normally closed contacts 90b of the limit switch 90 to fully retract the sweep 71. When the sweep 71 is fully retracted (rightwardly in FIG. 1) the pressure to motor 76 rises in conduit 125 and at the pre-set level actuates the sequence valve SV to supply pressure fluid to hydraulic motor 30 which drives the flight chains 42.

(10) The elevating flight 43 lifts the stack of articles C until the uppermost articles make contact with surface 84 (assuming standard size articles) and actuates limit switch 90 to open contacts 90b and close contacts 90a (as shown in FIG. 10).

(11) It should be remembered that as the flight 43 leaves limit switch 96 it results in the closing of contacts 96b and opening of contacts 96a to prevent the motors 24 from operating, and to make a circuit around contacts 118 in timer T4.

(12) Continuing from step 10, the forward coil 119 of valve 120 is energized through the now closed contacts 90a and the closed contacts 91a of limit switch 91 so that the motor 76 is energized in the forward direction to remove the uppermost articles from the stack thereof.

(13) When the motor 76 moves the sweep 71 to its forwardmost position limit switch 91 is actuated to open contacts 91a and to close contacts 91b thereby de-energizing the forward coil 119 at valve 120 and energizing the reversing coil 124 thereof so that pressure fluid now passes to conduit 125 to retract sweep 71, and as the sweep 71 fully retracts limit switch 91 is re-set to close contacts 91a and open contacts 91b.

(14) With sweep 71 retracted pressure of fluid in conduit 125 rises to a pre-set level to actuate the sequence valve SV and operate motor 30 to elevate flight 43 and the stack of articles thereon another distance, or until the next uppermost articles contact surface 84. This action takes place automatically as often as necessary to remove all articles from the flight 43.

(15) When all articles have been removed, motor 30 will run until the next flight 43 reaches the limit switch 96 to open contacts 96b with the sweep retracted and to close contacts 96a, while stopping motor 30 due to loss of pressure in conduit 125.

(16) Since limit switch contacts 96a are closed, the forward coil 108 in valve 109 is energized and the pusher 25 is again moved to deposit another stack of articles C on the flight 43. From this step, the several steps 5 through 15 are repeated as necessary to remove all stacks of articles and to unstack the same.

(17) As the last stack of articles is removed the motors 24 actuate limit switch 129 to close its contacts 129a and energize the coil 132 of on-delay timer T5. After a long enough delay to permit the motors 24 to reach the end of their stroke, the contacts 131 of the on-delay timer T5 are closed to energize the coil 132 of off-delay timer T6.

(18) The contacts 6a and 6b of timer T6 operate immediately and stay actuated long enough to permit the motors 17 and 24 to fully retract and clear the support 11 for the next load which may be handled beginning again at step 1.

The example given herein is not to be limited to the pattern of articles shown, such as two wide and five high with four rows, but may be applied with various other article dimensions and arrangements, even including articles in the same load which are not identical, except as to height. What has been described herein is an unstacker apparatus in which an endless conveyor 42 moves in a triangular closed path, one span of which is vertically inclined and extends from the article receiving station at a lower position to a higher position for discharge of the unstacked articles. The conveyor is very simply constructed so that the parts of the sweep 71 and heighth sensing means 82 are outside the same for easy access, and a discharge conveyor 57 is located within the triangular or closed path to avoid the usual troubles and structural problems associated with maintaining a gap for the return pass of the conveyor.

The construction and appearance of one preferred apparatus is shown and described herein, but no unnecessary limitations are to be inferred therefrom, as other constructions may be resorted to to remove articles from a load thereof and to unstack and place the articles on a conveyor in such a way that they can be moved to the next operation. Therefore, all such apparatus as may operate and function in the manner described and which may come within the scope of the invention is to be included in the appended claims.

What is claimed is:

1. Apparatus for unstacking a group of articles arranged in rows and vertical stacks with upper articles resting upon lower articles in the stacks thereof, said apparatus including an upwardly movable conveyor to elevate stacks of articles thereon and to move between a lower stack receiving position and a higher stack unloading position, an article engaging roll at the higher position to be engaged by the uppermost articles in the stacks and prepare the same to be removed from lower articles in the stacks, article sweep means in said apparatus having a member periodically movable into article abutment to remove the uppermost articles, and stack height sensing means in said apparatus adjacent the higher position of said conveyor including at least two article engaging surfaces in series, one of said surfaces being removable from the sensing means to adapt the apparatus to taller articles, a control element having a surface engageable by the uppermost articles to regulate the periodic movement of said sweep means to remove the uppermost articles successively engaging the surface of said control element.

2. Apparatus for unstacking a group of articles arranged in rows and vertical stacks with upper articles resting upon lower articles in the stacks thereof, said apparatus including an upwardly movable conveyor to elevate stacks of articles thereon and to move between a lower stack receiving position and a higher stack unloading position, an article engaging roll at the higher position to be engaged by the uppermost articles in the stacks and prepare the same to be removed from lower articles in the stacks, article sweep means in said apparatus having a member periodically movable into article abutment to remove the uppermost articles, stack height sensing means in said apparatus adjacent the higher position of said conveyor including a control element having a surface engageable by the uppermost articles to regulate the periodic movement of said sweep means to remove the uppermost articles successively engaging the surface of said control element, and a projection movable therewith and adapted to engage said surface of the control element and maintain movement of said sweep means to complete removal of the uppermost articles.

References Cited in the file of this patent

UNITED STATES PATENTS

| | | |
|---|---|---|
| 1,516,170 | Young | Nov. 18, 1924 |
| 2,161,836 | Stevenson | June 13, 1939 |
| 2,258,461 | Marsden et al. | Oct. 7, 1941 |
| 2,459,204 | Van Vleck | Jan. 18, 1949 |
| 2,595,015 | Sparks | Apr. 29, 1952 |
| 2,659,497 | Verrinder | Nov. 17, 1953 |
| 2,698,693 | Nordquist | Jan. 4, 1955 |
| 2,707,060 | Nawman | Apr. 26, 1955 |
| 2,844,263 | Dreyer | July 22, 1958 |
| 2,885,097 | Lyon | May 5, 1959 |

OTHER REFERENCES

Lyon Machinery Company Pamphlet, 4 pages, Sept. 24, 1956. (Copy in Div. 4.)